United States Patent [19]

Moore et al.

[11] 4,225,770
[45] Sep. 30, 1980

[54] WELDING TUBULAR ARMATURE TABS USING TIG

[75] Inventors: Edwin C. Moore, Longmont; Robert J. Rogers, Boulder; Donald G. Wiechman, Longmont, all of Colo.

[73] Assignee: International Business Machines Corporation, Armonk, N.Y.

[21] Appl. No.: 878,536

[22] Filed: Feb. 16, 1978

Related U.S. Application Data

[63] Continuation of Ser. No. 736,006, Oct. 27, 1976, abandoned.

[51] Int. Cl.³ .................. B23K 9/00; H05B 1/00; B21J 13/08
[52] U.S. Cl. .................. 219/137 R; 219/159; 219/161; 219/124.1; 219/125.11; 29/597; 228/44.1 A; 228/46
[58] Field of Search .................. 29/597, 598; 219/121 EM, 158, 159, 160, 137 R, 124.1, 125.11; 310/264; 228/44.1 A, 46

[56] References Cited

U.S. PATENT DOCUMENTS

| | | | |
|---|---|---|---|
| 2,439,371 | 4/1948 | Sandberg | 219/159 |
| 3,045,103 | 7/1962 | Warner | 219/137 R |
| 3,368,054 | 2/1968 | Brunner | 29/597 |
| 3,519,790 | 7/1970 | Heller | 219/137 R |
| 3,600,544 | 8/1971 | Smith | 219/137 R |
| 3,783,232 | 1/1974 | Mengeringhausen et al. | 219/124 |
| 3,826,894 | 7/1974 | Melvin | 219/124 |
| 3,983,358 | 9/1976 | Karlen | 219/125 PL |

Primary Examiner—B. A. Reynolds
Assistant Examiner—M. Paschall
Attorney, Agent, or Firm—James A. Pershon; Joscelyn G. Cockburn

[57] ABSTRACT

Non-continuous forms are welded on an automatic device using a continuous welding process (e.g., Tungsten Inert Gas Process (TIG) with a continuous welding arc. The noise level of the welding system is below that which is prescribed by the Operational Safety and Health Act (OSHA). The device includes apparatus for indexing and positioning the non-continuous forms relative to the welding electrode. The device further includes apparatus for chilling the non-continuous forms during the welding process, and apparatus for periodically shunting the welding arc away from the non-continuous forms so as to maintain a continuous welding arc.

4 Claims, 5 Drawing Figures

WELDING TUBULAR ARMATURE TABS USING TIG

This is a continuation of application Ser. No. 736,006 filed Oct. 27, 1976 now abandoned.

BACKGROUND OF THE INVENTION

1. Field of the Invention

This invention relates to electric arc welding and, more particularly, to electric arc welding using a continuous arc with inert gas shielding.

2. Prior Art

This type of welding, i.e., electric arc welding with inert gas shielding, is well known in the prior art. It is often referred to as a continuous welding process and is generally used for welding continuous forms. The restriction in use of this type of welding stems from the fact that the noise produced by the high frequency HF current used to initiate the arc for this type of welding, when used for welding non-continuous members, runs almost continuously and generates noise that exceeds the level prescribed by the Operational Safety and Health Act, hereinafter called OSHA.

As is well known to those skilled in the art, OSHA is the National Agent which regulates noise level in industrial plants and factories. Generally, the regulation is such that the noise is kept below the level where it will damage human hearing. In a recent directive issued by OSHA, noise level has to be equal to or less than 85 decibels (i.e., $\leq 85$ dba). If the noise level exceeds this standard, workers in the vicinity of the noise creating means must wear hearing protection or the noise producing means must be contained within a sound proof enclosure.

Whenever the TIG process is used for welding continuous forms, the noise which is generated by the TIG welder is within the noise level prescribed by OSHA. However, when this process is used for welding non-continuous forms the noise level generated by the HF starting current exceeds the OSHA requirement. In order to satisfy the OSHA standard, the user must resort to either sound proofing or equip workers in the vicinity of the welder with hearing protection. Either approach significantly increases the cost to the user which, in turn, increases product cost. As a result, this type of welding is not used.

In order to appreciate and understand the noise problem created by the TIG process, a synopsis of the TIG welder operation will be given. Generally, a TIG welder incorporates two separate and distinct circuit systems, a high frequency start circuit and an AC or DC circuit. The function of the HF circuit is to initiate the welding arc. Once the arc is initiated, the welder automatically switches and runs on the DC or AC circuit.

As is well known to those skilled in the art, the high frequency circuit is a noise producing circuit. In fact, the noise created by the high frequency circuit is outside of the range prescribed by OSHA. However, this circuit is operational only momentarily, i.e., to initiate the welding arc, and, therefore, the human ear does not recognize the noise. As such, the OSHA standard is not violated. Once the arc is initiated, it will remain continuous if welding is done on a continuous form. The arc is continuous and it is sustained by the DC or AC circuit in the welder. As was stated, the DC or AC circuit produces a low level noise which is within tolerable levels.

However, if the welding is done on a non-continuous form or on an intermittent surface, the welder is always operating in the start mode which is noise producing. Stated another way, in welding an intermittent surface or form the high frequency circuit initiates the arc. However, before the running of the welder is transferred to the control of the DC or AC circuit, the arc is lost. As such, the system is forced to run in a start mode and produces intolerable noise.

In addition to the noise problem discussed above, the weld joint which is produced by the welder when it is running on the high frequency circuit is less than satisfactory and separates quicker than a joint which is formed by the welder when it is running on the DC or AC circuit. This result stems from the fact that when the system is running on the DC or AC circuit there is a steady flow of electrons, for a sufficient time, from the welding electrode to the members to be welded to create a homogenious joint. However, when the welder is running on the high frequency circuit, the flow of electrons is intermittent, which results in the creation of an unsatisfactory weld joint due to crystalization.

SUMMARY OF THE INVENTION

The present invention solves the prior art problems by a unique apparatus and method which allows the use of the TIG process for welding and maintaining the noise level of the welder below that which is prescribed by OSHA.

More specifically, the article to be welded is seated on the mandrel of a positioning means. The mandrel is maintained at an electrical ground potential. A clamp means having an electrical ground plane is affixed to the article. A TIG welder having an adjustable electrode is then positioned within arcing distance of the members to be welded. By activating the apparatus, the positioning means positions members to be welded relative to the electrode. A welding arc is initiated and a first electrical path is established between the electrode and the members to be welded. As soon as that member is transported from the vicinity of the electrode, a second electrical conducting path is established between the electrode and the ground plane. The net effect is that a continuous arc is created since there is always a conducting path between the electrode and ground. This, in turn, keeps the noise level within acceptable range. In another embodiment of the invention, only a single electrical grounding means inter-connects the article and ground.

The foregoing and other features and advantages of the invention will be apparent from the following more particular description of preferred embodiments of the invention, as illustrated in the accompanying drawings.

DESCRIPTION OF THE PREFERRED EMBODIMENTS

The present invention provides an apparatus means and fixture in which a continuous welding process is utilized for welding non-continuous or intermittent forms without producing the undesirable effect which is customarily associated whenever the present process is used for welding non-continuous forms in the prior art. Although the invention is applicable for welding any non-continuous forms, the invention will be demonstrated within an environment where the tabs of a motor armature are being welded. As such, the description of the invention, in accordance with the welding of armature tabs, is only illustrative and does not limit the scope of the invention since this process is intended to be used in any situation where non-continuous forms are welded.

THE ARTICLE

Figure 1:
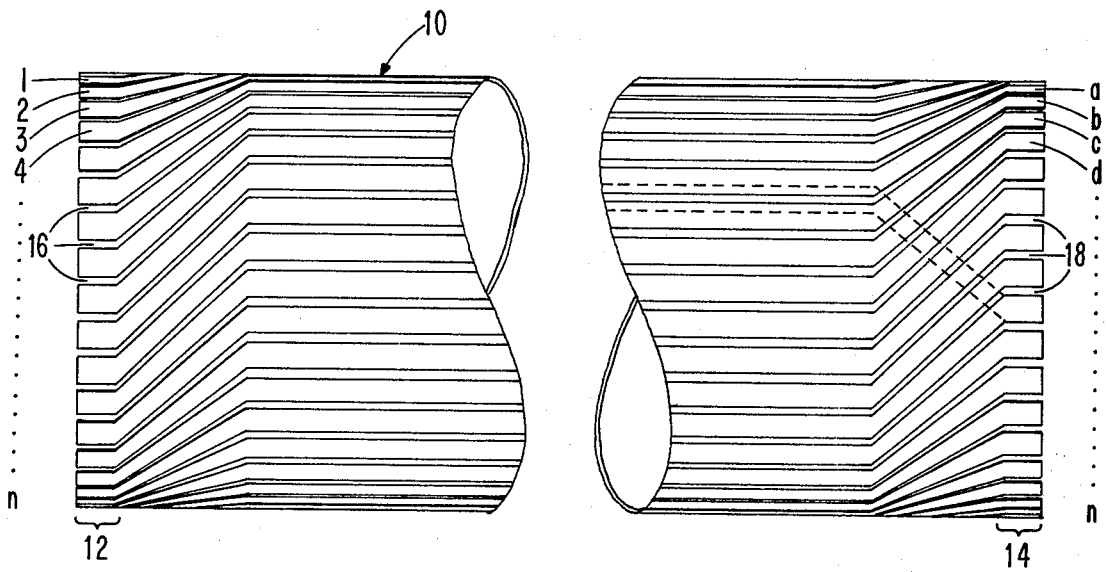
FIG. 1 is a perspective view of an article constructed in accordance with the teachings of the present invention.

FIG. 1 is a perspective view of a tubular armature 10 whose end portions, 12 and 14, are welded in accordance with the present invention. Each end portion comprises a plurality of tabs. For example, end portion 12 comprises tabs 1,2,3,4 . . . n. Similarly, end portion 14 comprises tabs a,b,c . . . n. Each tab is separated by a plurality of spacing 16 and 18, respectively. A more detailed description of armature 10 is given in U.S. Patent 3,634,708 issued to Gene Allen Fisher and assigned to the assignee of the present invention. Additionally, this process may be used for welding pancake armatures as well as the present tubular armature.

As will be explained hereinafter, in order to weld tab 1 or tab 2 or tab a or tab b, an arc is generated and is directed from a welding electrode to the selected tab. Once that tab is welded, armature 10 is indexed and one of the spacings, 16 or 18, is then positioned in operable proximity to the electrode. Since the arc cannot be maintained between the electrode and the space, the arc extinguishes itself. As soon as another tab is positioned, relative to the electrode, the arc is again initiated. It is this constant initiation of welding arc which makes this process unacceptable for welding non continuous or intermittent forms.

Armatures of the type shown in FIG. 1 are fabricated from two cards, each made by laminating a copper sheet to a suitable backing member, for example, fiberglass backing. A pattern of conductors are formed by chemical etching the copper from the backing at predetermined intervals. The backing is removed from the end portions 12 and 14 (FIG. 1) of these conductors to provide the areas which will be welded. This area is referred to as tabs. The cards are then placed, one on top of the other, such that the fiberglass from the inner card forms the inside diameter (I.D.) of the tubular armature and the fiberglass from the outer card insulates the cards from each other. The conductors are related so that when the ends are welded a coiled armature is formed. After proper alignment, they are glued together around a mandrel of proper diameter and the tabs are welded in accordance with the present invention to form an armature. In effect, each tab is a laminate. A more detailed description of the manufacturing process for a tubular armature is given in U.S. Pat. No. 3,650,021 which is assigned to the assignee of the present invention; while a detailed description of manufacturing process for a flat or pancake armature is given in U.S. Pat. No. 3,312,846 issued to Jacques Henry Baudot.

THE WELDING APPARATUS

Figure 2:
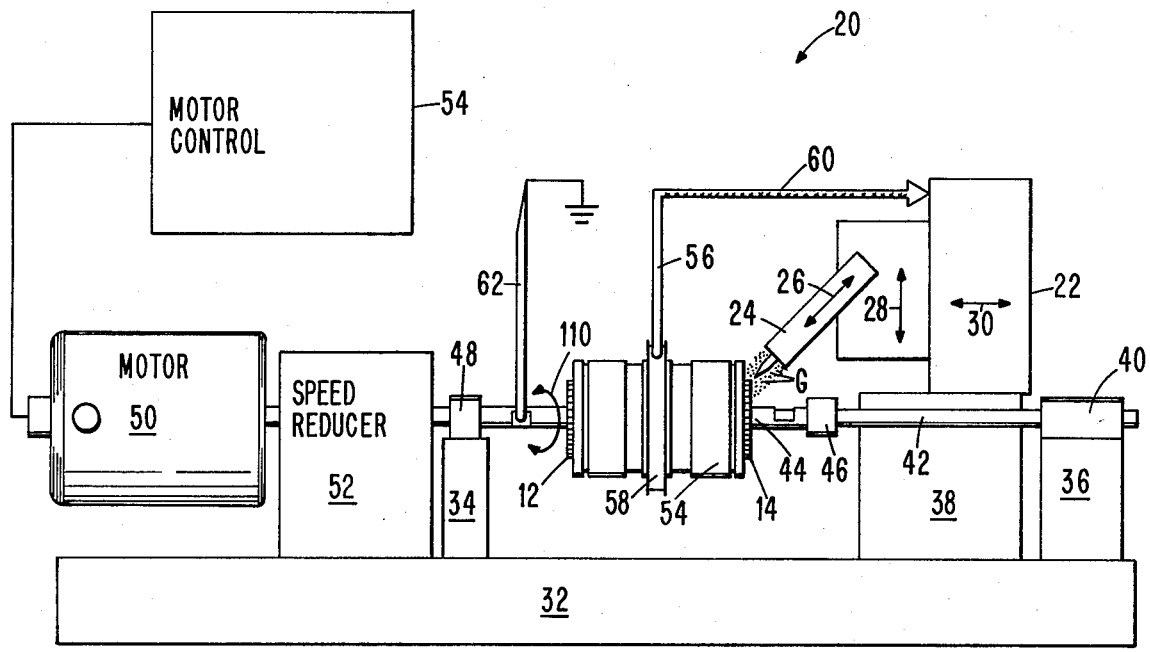
FIG. 2 is a perspective view of a device for welding in accordance with the present invention.

FIG. 2 shows a perspective view of the welding apparatus which is used for welding the tabs of the armature shown in FIG. 1. The apparatus includes a fixture 20 and welding means 22. Welding means 22 is a conventional TIG welder. Since TIG welders are well known in the prior art, a detailed description of their configuration or operation will not be given hereinafter. Suffice it to say that the TIG welder includes a high frequency circuit which is used for initiating a welding arc and an AC or DC circuit which sustains the arc for welding after it has been initiated. The welder also includes switching circuitry which automatically switches operation from the high frequency circuit to the DC or AC circuit once the welding arc is initiated. Welding means 22 includes a welding electrode 24 which has movement in the directions shown by arrows 26, 28 and 30 respectively. Welding means 22 is positioned relative to fixture 20. By orientating welding electrode 24, the electrode is positioned within arcing distance of the article or tab to be welded.

Still referring to FIG. 2, fixture means 20 is operably associated with the welding means 22 and is used to position a work piece in proximity with the welding electrode for welding. Fixture 20 includes a frame 32, with end portions 34 and 36 attached to said frame. Shaft 38 is interconnected to end portion 36 via a spring loaded connector 40. With this spring loaded connection, shaft 38 has movement in the direction shown by arrow 42. As will be discussed later, the movability of shaft 38 allows mandrel 44, upon which the armature is positioned for welding, to be removed and inserted in fixture 20. Connecting means 46 is attached to the free end of shaft 38. This connecting means functions to receive one end of mandrel 44. The other end of mandrel 44 is attached to connecting means 48 which is seated upon end portion 34.

In order to rotate or position the individual tab of armature 10, relative to welding electrode 24, mandrel 44 is driven by a variable speed motor 50 which is connected to a speed reducing means 52. The motor and speed reducing means is coupled to the mandrel shaft via coupling means 48. Any conventional variable speed motor with suitable motor speed controller 54 can be used for driving mandrel 44. In the preferred embodiment of this invention, a variable speed motor, having an average speed of 1200 revolutions per minute, was used. This speed reducer has a 150 to 1 gear reducing ratio. This means that the mandrel, with its associated work piece, is driven at an approximate speed of 11 revolutions per minute. As such, each end or each armature requires an approximate time of five seconds for welding. This method of welding is more efficient than manual methods such as pulse arc or resistance welding which requires approximately 1 sec. per tab. Of course, it is within the skill of the art to vary the speed and setting of the motor and its speed reducer to achieve a faster or slower rate of welding without departing from the scope of this invention.

Still referring to FIG. 2, in order to weld the tabs which are associated with end portion 14 or 12 (FIG. 1), armature 10 is seated on mandrel 44. Fixture means 54, which includes a chill ring and a grounding means, is attached to encircle armature 10. The combination, that is fixture 54, armature 10, and mandrel 44, is connected to fixture 20 at connectors 48 and 46 respectively. The welding electrode 24 of welding means 22 is then adjusted to be within arcing distance of end portion 14. As the welding means is turned on, a supply G of monatomic gas enshrouds the tip of the welding electrode and the tabs to be welded. The presence of the gas ensures that the weld is not contaminated as a result of chemical reaction or foreign elements from the surrounding atmosphere. The detail of fixture 54 is discussed hereinafter; suffice it to say that in order to ground the fixture, a spring loaded brush 56 rides on ring 58. Ring 58 is the grounding ring for the fixture. Spring loaded brush 56 is grounded via connecting means 60 through the welding means 22. Another spring loaded brush, 62, rides upon mandrel 44 and operates to define a second conductive path between the mandrel and ground. In operation, either fixture 54 or mandrel 44 may be grounded, however, in some applications only one of the two, and not both, is grounded. Also mandrel 44 and fixture 54 may be grounded through grounding means 22.

Figure 3:
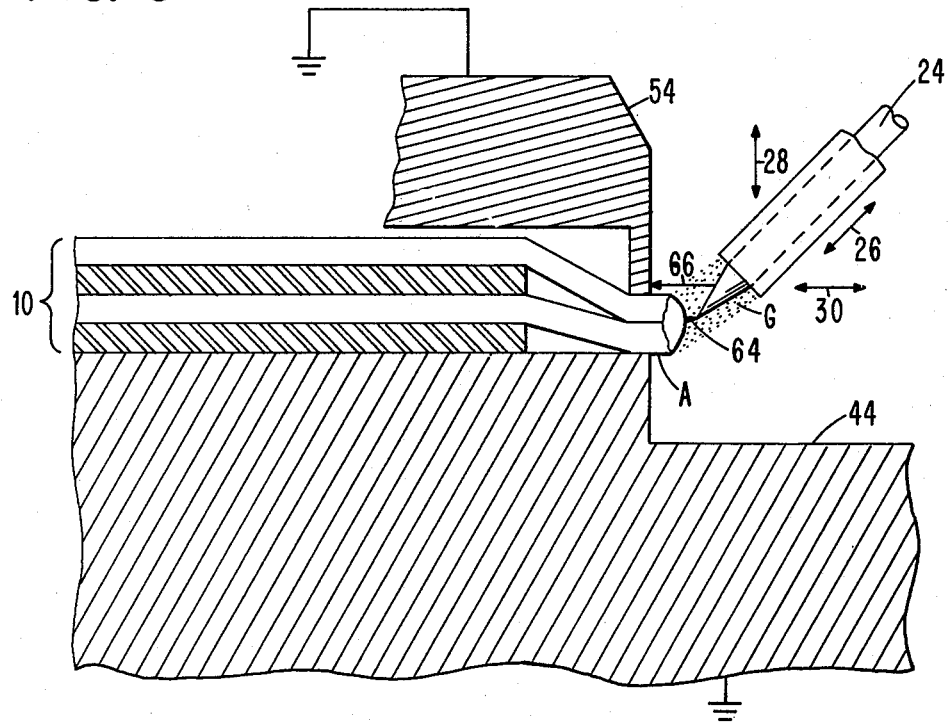
FIG. 3 is a cross section of the work piece to be welded and is helpful in understanding the disclosed invention.

Referring to FIG. 3, a sectional view of mandrel 44, with armature 10 and fixture 54 is shown. Tab A, which is associated with end portion 14 of armature 10, is positioned relative (that is within arcing distance) of electrode 24. As soon as welding means 22 (FIG. 1) is turned on, an arc is generated between electrode 24 and Tab A in the direction shown by arrow 64. The arc remains on momentarily until tab A is welded. However, as the armature is rotated by the drive means passing the electrode, a blank space, for example 18 (FIG. 1), is then positioned under the welding electrode. As is well known in basic electrical theory, electrons tend to flow along a path of least resistance. This being the case, a second conducting path is generated between the electrode and fixture 54 or mandrel 44. This second conducting path is identified by arrow 66. As soon as the space is rotated past the electrode 24, the arc again will be between the new tab and the electrode along ath 64. This process is alternated, that is electrons continue to flow along path 64 or 66 and/or 65 until the tabs on armature 10 are welded. In order to create a conducting path between the conductors to be welded, both mandrel 44 and fixture 54 are grounded. Of course, the device can be operated with either the fixture 54 or the mandrel 44 grounded. However, it is determined that by grounding both the fixture and the mandrel, the quality of the welded joint is superior to the joint created when only the mandrel or the fixture is grounded. By creating dual conducting paths, once the arc is initiated it is maintained continuously and, therefore, the welder can be operated on the DC or AC circuit without generating undesirable high frequency noise.

Figure 4B:
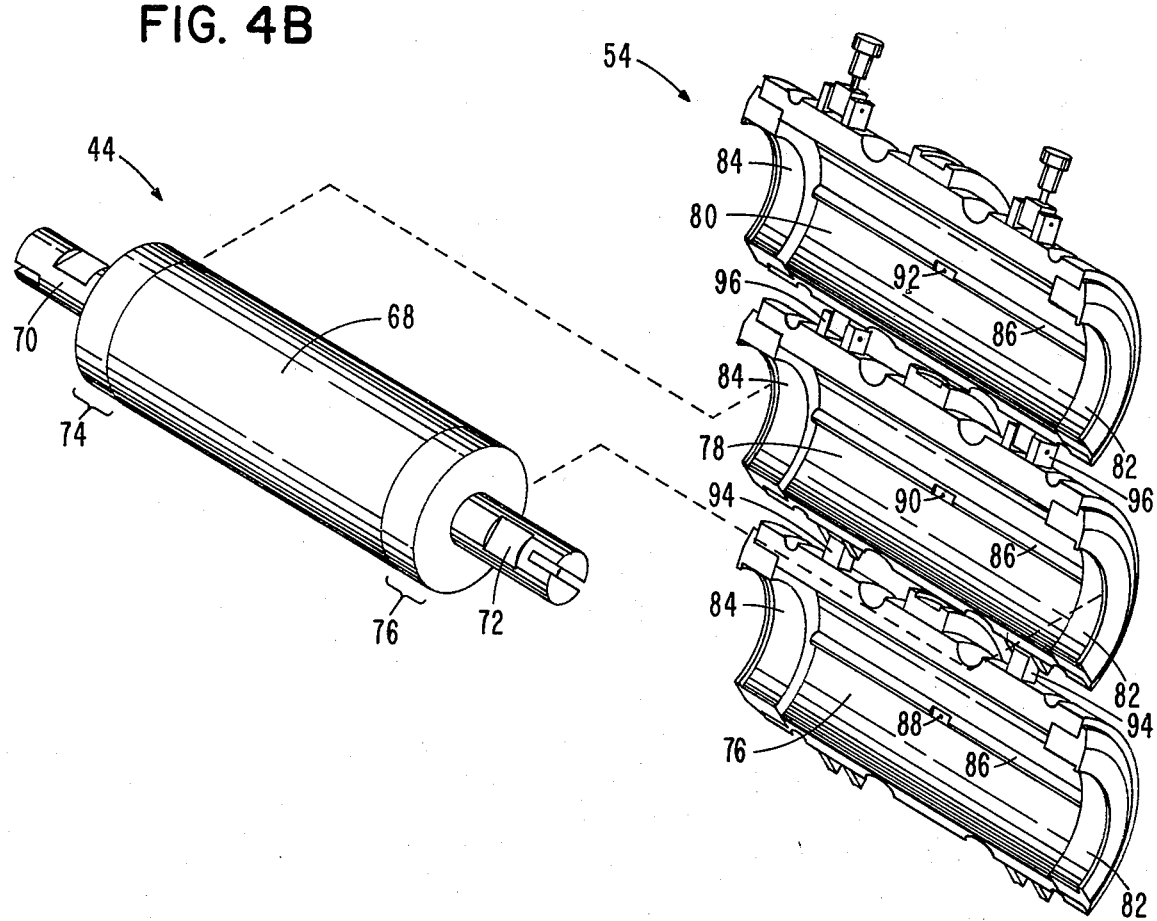
FIGS. 4A and 4B depict the mandrel and clamp assembly which forms the mechanism for inter-connecting the article of FIG. 1 with the electrical ground potential.
Figure 4A:
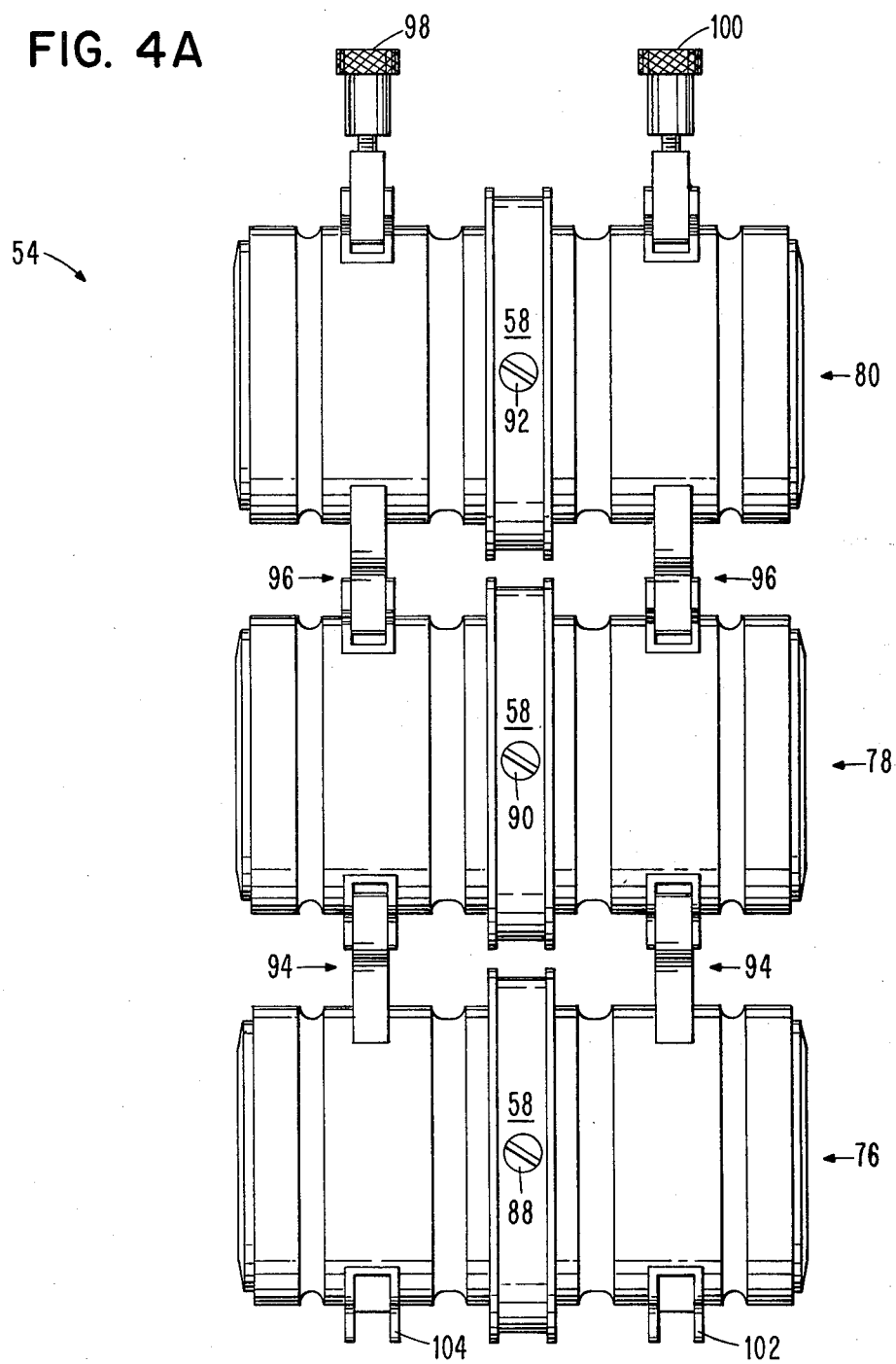

Referring now to FIG. 4A and FIG. 4B, a perspective view of mandrel 44, together with fixture 54 is shown. FIG. 4A shows a perspective view of the back of fixture 54, while FIG. 4B shows a perspective view of mandrel 44 sitting apart from the front of fixture 54. Mandrel 44 includes a central portion 68 and two end portions 70 and 72 respectively. End portions 70 and 72 are machined so that they can be fitted into connecting means 46 and 48 of fixture 20 (FIG. 2). The central portion, 68, of mandrel 44 has a substantially cylindrical shape. The shape is such that armature 10 fits snugly onto the mandrel. Of course, it is within the skill of the art to manufacture the mandrel with a shape different from the one shown in FIG. 4B. Therefore, the design of the mandrel is dependent on the shape of the work piece to be welded and merely changing the shape of the mandrel will not depart from the scope of this invention. As was stated earlier, mandrel 44 operates to support the workpiece and also to define a conductive path to ground. In order to achieve the electrical conducting function, conducting rings 74 and 76 are positioned one on each end of central portion 68. Although several conducting materials can be used for manufacturing the conducting rings, within the preferred embodiment of this invention the conducting rings were fabricated from copper. By positioning the workpiece on mandrel 44 so that the portions to be welded are in contact with one of the conducting rings (see FIG. 3) and then grounding the mandrel via spring loaded brush 62 (FIG. 2), the entire mandrel is grounded whenever necessary. In order to form an electrical isolation between the conducting mandrel and fixture 20, end portions 34 and 36 (FIG. 2) are manufactured from insulating material.

Still referring to FIG. 4, fixture 54 includes three separate, but identical sections identified as portions 76, 78 and 80 respectively. Among other things, fixture 54 operates as a grounding means during a welding operation when there is no electrical conduction between the workpiece and the welding electrode along conducting path 64 (see FIG. 3). Stated another way, whenever space 18 or 16 is positioned within arcing distance of welding electrode 24, in order to maintain a continuous arc a second conductive path to ground is achieved between fixture 54 and welding electrode 24 via electrical conductive path 66. In addition to the conductive function, fixture 54 operates as a chill ring for maintaining the temperature of the workpiece within acceptable limits. Each section of fixture 54 is identical in geometric shape and construction. As such, the description of any section is an adequate description of all three sections. For example, section 76 has a substantially cylindrical geometric shape. Again, this shape should not be regarded as a limitation on this invention. Generally the shape of the fixture will assume the shape of the workpiece to be welded. In the preferred embodiment of this invention where a substantially cylindrical armature is welded, the work fixture is fabricated with a cylindrical shape to mirror that of the cylindrical armature. However, in the situation where the armature has a different shape, example a pancake armature, then the geometry of the workpiece would be substantially that of the pancake armature. In other words, the shape would mirror that of its associated armature.

Still referring to FIG. 4, each section of fixture 54 includes two conductive rings 82 and 84 respectively; with one positioned on each end of the longitudinal dimension of the fixture. Both conductive rings are interconnected via a conducting plane 86. Conducting plane 86 is then connected to conducting ring 58 via conducting means 88, 90 and 92 respectively. The front portion of the connecting means are shown in FIG. 4B while the back portion of the connecting means are shown in FIG. 4A. To complete the fixture 44, each section of said fixture is hinged together by second connecting means 94 and 96 respectively. For closing the fixture latching means 98, 100, 102 and 104 are attached to end portions 80 and 76 respectively. In order to close the fixture about workpiece, latching means 98 is mated with latching means 104 while latching means 100 is mated with latching means 102. Again, several different types of latching means can be implemented without departing from the scope of this invention. By using a sectional approach to design fixture 54, each of the identical sections is grounded via brush assembly 56 which rides on conducting ring 58 (see FIG. 2). By so doing, fixture 54 is always grounded to create a second electrical conductive path between the welding electrode and ground. This completes the detailed description of the preferred embodiment of the invention.

OPERATION

In operation, a workpiece such as armature 10 (FIG. 1) is seated on mandrel 44 (FIG. 4). Fixture 54 is then operable positioned about the workpiece and is latched into place via the latching means 98, 100, 104 and 102 respectively. The mandrel is then connected to welding fixture 20 via connecting means 48 and 46 (FIG. 2). Welding electrode 26 of welding means 22 is then positioned to be within arcing distance for welding the tabs of the armature (FIG. 2 and FIG. 3). The workpiece is then rotated in either direction shown by arrow 110 (FIG. 2). As soon as a tab is passed by welding electrode 24, said tab is welded. However, as a space passes by the electrode the arc is shunted to fixture 54 or mandrel 44. The process is repeated until the workpiece is welded.

While the invention has been particularly shown and described with reference to preferred embodiments thereof, it will be understood by those skilled in the art that various changes in form and details may be made therein without departing from the spirit and scope of the invention.

What is claimed is:

1. Welding apparatus for a workpiece having electrically conductive and non-conductive surfaces comprising in combination:
    welding means having a welding electrode at a first electrical potential for generating an electrical welding arc;
    positioning means operably associated with said welding means for positioning the workpiece in close proximity to the welding electrode;
    first conductive means electrically connected between the conductive surface of the workpiece and a second electrical potential; and
    a clamp operable for chilling the workpiece and as a second conductive means adjacent the non-conductive surface of the workpiece, said clamp supporting the workpiece and defining a second electrical conductive path to the second electrical potential, whereby said first conductive means and said clamp alternatively conduct current with the welding electrode so as to enable a continuous arc generation, wherein said clamp comprises:
    a member including a plurality of sections with each section having a geometrical shape substantially equivalent to the workpiece;
    means associated with each section of said member electrically connected to the second electrical potential;
    means for joining each section to form the member; and
    means for locking the member so as to encompass the workpiece.

2. A welding apparatus as claimed in claim 1 wherein said member is substantially cylindrical and fabricated from a material having relatively high heat absorbing characteristics.

3. A welding apparatus as defined in claim 1 wherein said positioning means comprises:
    a support frame;
    end connectors operably associated with said support frame; and
    rotatable mandrel means operably connected to the end connectors for alternatively positioning the surfaces of the workpiece adjacent to the welding electrode.

4. A welding apparatus as claimed in claim 3 further including:
    a variable speed motor connected to said rotatable mandrel means; and
    means for controlling the speed of said motor.

* * * * *